Aug. 4, 1953  B. W. KEESE  2,647,597
VEHICLE DRIVE MECHANISM
Filed June 19, 1947  3 Sheets-Sheet 1

INVENTOR.
Beverly W. Keese
BY
Strauch & Hoffman
Attorneys

Aug. 4, 1953  B. W. KEESE  2,647,597
VEHICLE DRIVE MECHANISM
Filed June 19, 1947  3 Sheets-Sheet 2
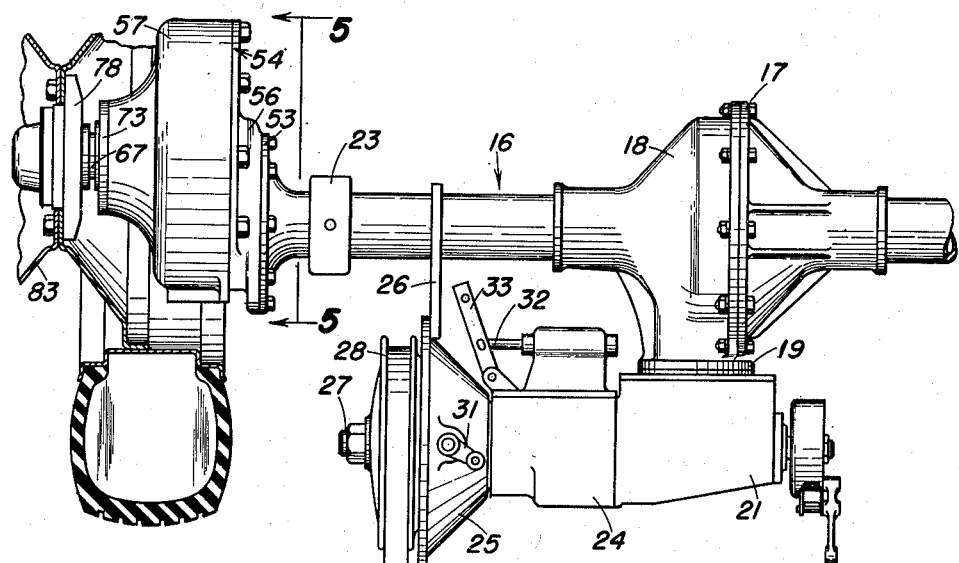
Fig. 2
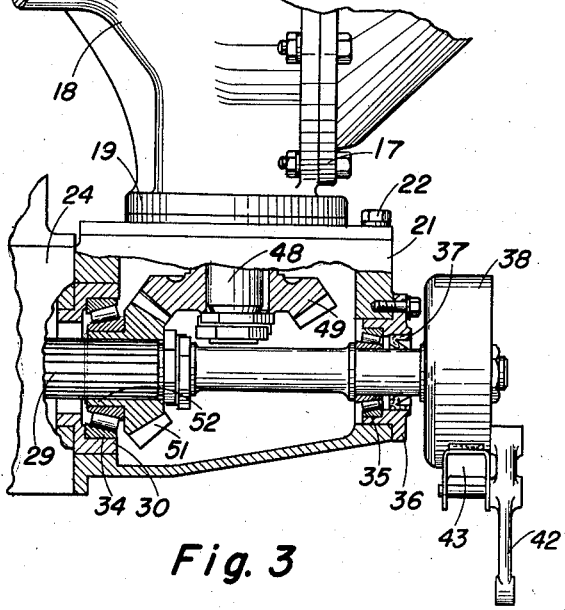
Fig. 3
Fig. 4
INVENTOR.
Beverly W. Keese
BY
Strauch + Hoffman
Attorneys Aug. 4, 1953 B. W. KEESE 2,647,597
VEHICLE DRIVE MECHANISM
Filed June 19, 1947 3 Sheets-Sheet 3

INVENTOR.
Beverly W. Keese
BY
Strauch & Hoffman
Attorneys

Patented Aug. 4, 1953

2,647,597

UNITED STATES PATENT OFFICE 2,647,597

VEHICLE DRIVE MECHANISM

Beverly W. Keese, Oshkosh, Wis., assignor to The Timken-Detroit Axle Company, Detroit, Mich., a corporation of Ohio Application June 19, 1947, Serial No. 755,650

2 Claims. (Cl. 192—4)

This invention relates to vehicle drive mechanism and is particularly concerned with drive and drive axle arrangements and constructions which are peculiarly adapted to tractors, combines, and similar farm or like vehicles which are mainly used off the roadway.

It is a primary object of the present invention to provide a vehicle of this type which has a novel arrangement of drive axle, transmission and transversely disposed motor, where the axes of all three are parallel and wherein the axes of the transmission and axle may lie either in substantially the same horizontal plane, or the transmission may be slightly displaced above the drive axle.

A further object of the present invention is to provide a novel drive assembly embodying a transversely disposed motor and a transmission adjacent the rear axle in such a vehicle, wherein the axes of the motor, transmission and axle are all parallel with the motor axis disposed well above the others, and wherein the transmission is supported by the axle housing.

A further object of the invention is to provide a novel variable speed transmission and axle assembly wherein the transmission output shaft extends through an adapter housing secured to the differential enclosing portion of the axle and the transmission housing, and wherein a brake is mounted on the transmission output shaft at the other side of the adapter housing.

It is a further object of this invention to provide a vehicle having an axle driven by an engine mounted above the said axle and having its crankshaft parallel thereto, and a variable speed transmission mounted in substantially the same horizontal plane as the axle and parallel thereto and constituting a driving connection between said axle and said engine.

Further objects of the invention will become apparent as the description proceeds in connection with the appended claims and the annexed drawings wherein:

Figure 1 is a side elevation illustrating the axle, transmission and motor arrangements in a vehicle according to a preferred embodiment of the invention;

Figure 1-A is a view of an optional arrangement wherein the transmission is at a higher level than the axle;

Figure 2 is a top plan view further illustrating the driving arrangements of the vehicle;

Figure 3 is an enlarged top plan view partially in section illustrating the connection between the transmission output shaft and the pinion shaft of the axle, and illustrating the brake on the transmission output shaft;

Figure 4 is a side elevation further illustrating the brake mechanism on the transmission output shaft;

The description continues with reference to the drawings wherein like reference numerals designate the same parts throughout the several figures.

Figure 1:
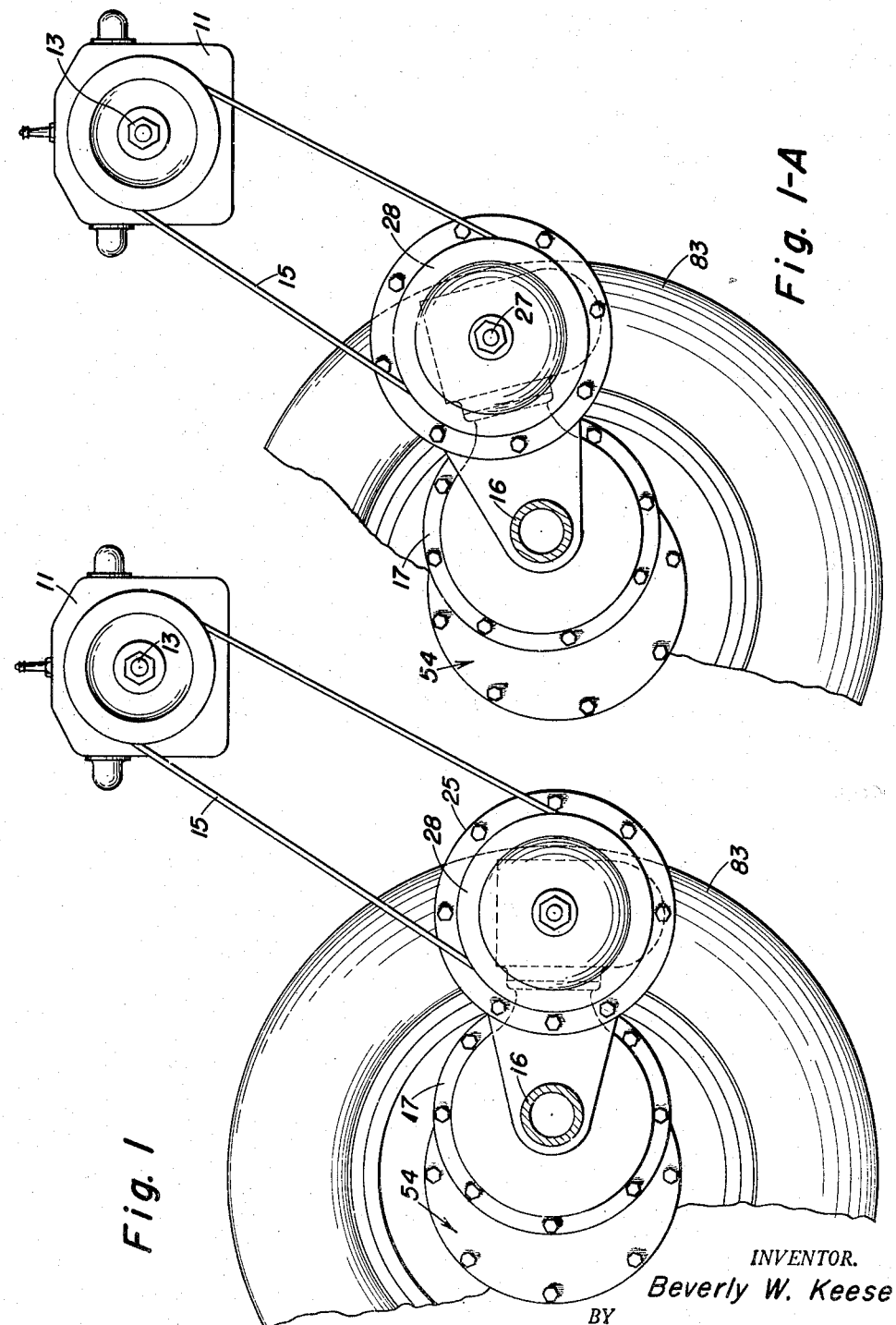

In its preferred embodiment, the invention will be described as an adaptation to a farm tractor or combine machine, wherein the various drive mechanism parts are suitably mounted on a rigid frame in the desired location. Most of the details of the frame are omitted in the accompanying drawings for the sake of clarity of disclosure, since details of the frame elements themselves are not part of the present invention, but it will be understood that wherever the parts are indicated in the drawings, adequate frame support is provided for mounting them in that position.

The preferred arrangement of my vehicle drive mechanism part is illustrated in Figuers 1 and 2, wherein an internal combustion engine 11 is suitably mounted on the frame by means not shown but of conventional construction. The output end 13 of the crank shaft carries a pulley 14 for driving a belt 15. As illustrated in Figure 1, motor 11 is mounted on the tractor frame with its crank shaft axis substantially horizontal and transverse to the direction in which the vehicle moves, and at a substantially higher level than the axle to be driven thereby.

With reference now to Figure 2, the drive axle of the tractor preferably comprises a split type axle 16 of the general type illustrated and described in United States Letters Patent to Alden No. 2,056,881, and which comprises tubular portions having enlarged center sections joined or bolted along a transverse flange 17, with one of the enlarged center sections 18 having an opening surrounded by a bolting flange 19 to which is secured an adapted housing 21 as by bolts 22. Axle 16 is connected to the frame by supports 23, which are the same at both ends of the axle.

Referring now to Figure 2, adapter housing 21, which is mounted on the axle housing as described, is open at one side and has secured thereto one end of a variable speed transmission housing 24. The other end of transmission housing 24 is in turn rigidly secured to a friction clutch housing 25 that is also secured as by attaching bracket 26 to axle housing 16. The input shaft 27 of the clutch and transmission assembly has a pulley 28 secured thereto adapted to be driven by belt 15. The transmission output shaft 29, which projects into adapter housing 21, is arranged coaxially with shaft 27 so that these shafts extend horizontally and transversely of the vehicle, and in the embodiment of Figure 1 their common axes lie in a horizontal plane parallel to the crank shaft axis and including the drive axle axis as will appear.

The clutch at 25 may be of the friction disc type of conventional construction, and it has an external operator at 31 by which it may be released or engaged, and further description thereof is not deemed necessary as it operates in a conventional manner. Similarly, variable speed transmission housing 24 contains conventional shiftable forward and reverse gearing, including shifter forks operated by a shifter rail 32, which in turn is operably connected to a pivoted lever 33 having a connection or extension within reach of the operator of the vehicle. Since this transmission is of a conventional type, such as is usually used behind the friction clutch of a truck, further description thereof is not deemed necessary.

With reference now to Figure 3, transmission output shaft 29 is supported where it enters housing 21, by a tapered roller bearing assembly 34. At its outer end where it projects through the closed side wall of housing 21, shaft 29 is supported in a further tapered roller bearing assembly 35, which is held in place by a bearing cap 36 bolted to the side wall of the housing. A suitable oil seal 37 prevents escape of lubricant from the housing.

Externally of housing 21, shaft 29 has non-rotatably secured thereto a brake drum 38, as by a suitable flange and bolt assembly 39, and a brake shoe assembly of the dual brake shoe type, adapted to simultaneously grip the outer and inner peripheries of drum 38, is provided at 41 and actuated by a lever 42 for manual braking of the vehicle. This brake is the equivalent of the usual propeller shaft brake in a conventional truck. Brake 41 comprises an external brake shoe 43 which is pivoted at 44 on housing 21 by means of a suitable bracket, not shown, and has an inner brake shoe 45 carried by and connected to lever 42 and outer brake shoe 43 by a pivoted link 46, whereby actuation of lever 42 causes simultaneous application of the brake shoes to the opposite peripheries of the drum 38. This brake is preferably of the type shown in United States Letters Patent No. 2,239,977, issued April 29, 1941, to which attention is referred for further detail.

Figure 5:
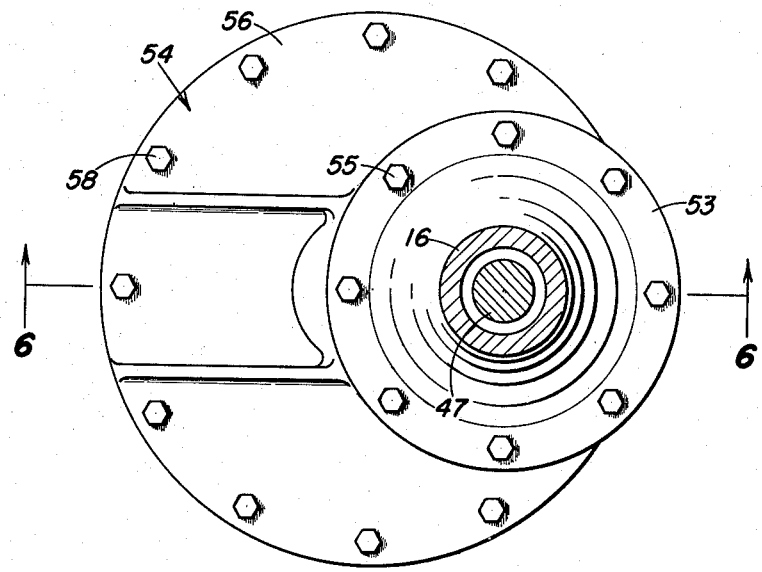
Figure 5 is a section along line 5—5 of Figure 2 illustrating the disposition of the reduction gear box relative to the axle housing.

The enlarged center section portion of axle 16 contains the usual differential cage which drives oppositely extending axle shaft 47 (Figure 5). A conventional pinion shaft 48, which carries a differential driving pinion within the axle housing, is supported in suitable bearings in the rearwardly extending nose of portion 18, and it has secured thereto a bevel gear 49 constantly meshed with a bevel gear 51 splined to transmission output shaft 29, so that the axle mechanism is constantly drive connected to the transmission output shaft 29. In the illustrated construction, preferably gear 51 has an integral collar 52, forming a shoulder on which the internal race of bearing assembly 34 is seated, and bearing assembly 34 is mounted in a pilot member 30 inserted in the wall of housing 21 to radially locate the bearing and adapt housing 21 to support shaft 29.

Figure 6:
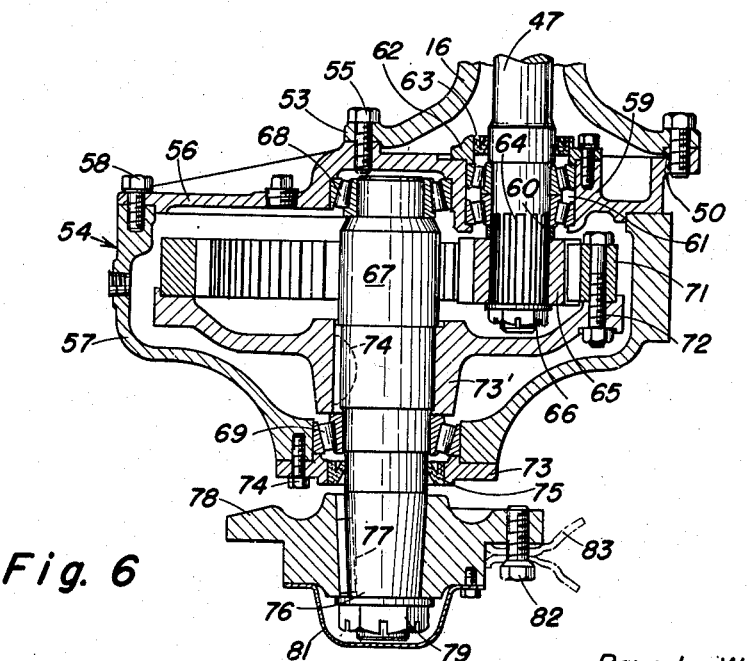
Figure 6 is a section along line 6—6 of Figure 5 illustrating details of the reduction gearing.

As indicated above, the axle 16 is preferably of standard split type construction, and such axles usually have a flanged end portion 53 (Figure 6) for mounting the brake parts at the outer end of the axle. Referring now to Figure 6, which illustrates a construction that is identical at both ends of the axle, a gear reduction housing 54 is piloted on flange 53 as on recess 50 and is bolted to flange 53 as by studs or bolts 55, the greater part of housing 54 being disposed forwardly of housing 16 as illustrated in Figure 5. Gear reduction housing 54 comprises two parts; an inner or cover part 56, to which flange 53 is bolted, and an outer cup-shaped part 57, which is bolted around its periphery as at 58 to inner part 56.

Near its rear end, cover 56 is formed with an integral outwardly extending hollow boss 59 containing a roller bearing assembly 61 for supporting the outer end of axle shaft 47, the latter being driven from the usual differential mechanism within the axle. Bearing 61 is preferably a double tapered roller bearing assembly serving both as a thrust bearing and a radial support bearing and is held in place by a cap 62 bolted to part 56 and provided with an oil seal 63 for preventing escape of lubricant from the reduction gear chamber.

Beyond bearing 61 and within the reduction gear chamber, the end of axle shaft 47 is splined as at 64, and a spur pinion 65 is fitted onto splined section 64 and held there against axial movement as by a lock nut assembly 66 which urges pinion 65 against a spacer ring 60 backed by the inner race of bearing 61. A wheel spindle 67 is rotatably mounted above the axle shaft on spaced bearings 68 and 69 in parts 56 and 57 respectively of the reduction gear housing, for rotation about an axis which is parallel to but displaced forwardly and in the same horizontal plane as axle shaft 47. Within the reduction gear chamber, an internal ring gear 71, in constant mesh with pinion 65, is secured as by bolts 72 to a hub 73' that is keyed as at 74 for constant rotation with spindle 67. Axle shafts 47 are therefore each constantly drive connected to wheel spindles 67 through reduction gearing comprising a pinion 65 and a ring gear 71.

A bearing cap 73, secured to part 57 as by bolt 74 and carrying a seal 75 about shaft 67, encloses the outer end of the reduction gear housing and prevents escape of lubricant outwardly. Cap 73 prevents outward axial displacement of spindle 67, acting through bearing 69 and hub 73'. Beyond the reduction gear housing, spindle 67 is formed with a tapered end portion 76 on which is pressed and keyed, as at 77, a wheel attachment hub 78 that is held against axial displacement on the spindle by a suitable lock nut assembly 79. The end of the shaft is protected against dirt by a sealing cap 81 of thin metal.

As illustrated in Figure 6, hub 78 has secured thereto, as by bolts 82, a wheel assembly 83, which may be either a dual wheel assembly or a single wheel assembly, depending on the circumstances and the desired vehicle. It will be appreciated therefore that the wheel assembly 83 is connected to be driven by a gear reduction from the axle shaft 47. The fact that the cover 56 of the reduction gear housing serves as both a piloted adapter for connecting the reduction gear housing to the axle housing flange in predetermined location, and as a carrier for the drive pinion 65, provides a construction wherein the center distance between the axes of axle shaft 47 and wheel spindle 67 may be maintained exactly and misalignment between pinion 65 and ring gear 71 is held at a minimum to thereby increase the mechanical efficiency of the assembly.

From the foregoing it will be readily apparent that with reduction gear boxes of the type described used at the extremities of the axles, neither the axle shaft, differential nor transmission will be required to withstand the heavy torque loads required by the propelling wheels to move the combine over soft or rugged terrain. The manufacturer is, therefore, able to supply a light torque load drive axle of conventional design which is adapted by the addition of reduction gear boxes of the type described for supplying a high torque to the propelling wheels.

In the further embodiment of the invention illustrated in Figure 1-A, the transmission 24 is disposed at a higher level than the axle housing 16. When the transmission output shaft is so located at a higher level than the axle shaft 47, this requires rotation of the axle housing 16 and the mechanism in it about its axis through a small angle, until the axis of pinion shaft 48 intersects the axis of transmission output shaft 29, as illustrated in Figure 1-A, but no other changes in construction from the above described embodiment are required. It will be appreciated that by this latter arrangement, the angular arrangement of the transmission and axle may be varied to suit the invention to substantially any vehicle, according to the dictates of space limitations in that vehicle, without departing from the spirit of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a drive axle assembly, an axle housing comprising an enlarged center section provided with an opening, a rotatable pinion shaft journalled on said axle housing and projecting through said opening, a variable speed transmission housing having an end wall opening and an output shaft projecting through said end wall opening at right angles to said pinion shaft, a transfer gear housing separate from said transmission housing having a first opening aligned with said axle housing opening to receive said pinion shaft and having a second opening to receive said transmission output shaft, said transmission output shaft passing entirely through said transfer gear housing and projecting therefrom through a third opening opposite said second opening, a brake assembly operatively associated with said transmission output shaft exteriorly of said transfer gear housing, gearing in said transfer gear housing interconnecting the transmission output shaft and the pinion shaft, means rigidly but removably securing said transfer gear housing to said axle housing, and means rigidly but removably securing said transfer gear housing to said transmission housing to provide a rigid assembly.

2. In a drive axle assembly, an axle housing comprising an enlarged center section provided with an opening, a rotatable pinion shaft journalled on said axle housing and projecting through said opening, a variable speed transmission housing having an end wall opening and an output shaft projecting through said end wall opening at right angles to said pinion shaft, a transfer gear housing separate from said transmission housing having a first opening aligned with said axle housing opening to receive said pinion shaft and having a second opening to receive said transmission output shaft, said transmission output shaft passing entirely through said transfer gear housing and being journalled in a wall of said transfer gear housing opposite said second opening, gearing in said transfer gear housing interconnecting the transmission output shaft and the pinion shaft, means rigidly but removably securing said transfer gear housing to said axle housing, and means rigidly but removably securing said transfer gear housing to said transmission housing to provide a rigid assembly.

BEVERLY W. KEESE.

References Cited in the file of this patent

UNITED STATES PATENTS

| Number | Name | Date |
|---|---|---|
| 894,060 | Ruemelin | July 21, 1908 |
| 1,291,816 | Fielder | Jan. 21, 1919 |
| 1,337,369 | Polaski | Apr. 20, 1920 |
| 1,641,803 | Danly | Sept. 6, 1927 |
| 1,914,683 | Clapper et al. | June 20, 1933 |
| 2,055,724 | Irgens | Sept. 29, 1936 |
| 2,056,881 | Alden | Oct. 6, 1936 |
| 2,254,360 | Frudden et al. | Sept. 2, 1941 |
| 2,262,456 | Grater | Nov. 11, 1941 |
| 2,402,637 | Keese | June 25, 1946 |
| 2,510,325 | Anderson | June 6, 1950 |

FOREIGN PATENTS

| Number | Country | Date |
|---|---|---|
| 26,230 | Great Britain | Apr. 24, 1913 |
| 362,634 | Great Britain | Dec. 10, 1931 |
| 547,857 | France | Dec. 27, 1922 |
| 837,983 | France | Feb. 23, 1939 |